United States Patent [19]
Murayama et al.

[11] Patent Number: 5,790,582
[45] Date of Patent: Aug. 4, 1998

[54] LASER OSCILLATOR

[75] Inventors: Katsuki Murayama; Ryoji Koseki, both of Ishikawa-Ken, Japan

[73] Assignee: Shibuya Kogyo Co., Ltd., Kanazawa, Japan

[21] Appl. No.: 790,026

[22] Filed: Jan. 28, 1997

[30] Foreign Application Priority Data

Feb. 2, 1996 [JP] Japan .................................. 8-040389
Mar. 15, 1996 [JP] Japan .................................. 8-087196

[51] Int. Cl.$^6$ .................................................. H01S 3/097
[52] U.S. Cl. ............................ 372/86; 372/87; 372/61
[58] Field of Search ................................. 372/86, 87, 61, 372/65

[56] References Cited

U.S. PATENT DOCUMENTS

| | | | |
|---|---|---|---|
| 3,437,950 | 4/1969 | Okaya et al. | 372/61 |
| 3,970,956 | 7/1976 | Bolduc | 372/87 |
| 4,156,208 | 5/1979 | Sasnett | 372/87 |
| 4,257,014 | 3/1981 | Hattori et al. | 372/61 |
| 4,734,915 | 3/1988 | Mefferd et al. | 372/61 |
| 4,736,379 | 4/1988 | Barker et al. | 372/61 |
| 4,811,355 | 3/1989 | Krueger et al. | 372/61 |
| 5,115,439 | 5/1992 | Howard | 372/61 |

FOREIGN PATENT DOCUMENTS

| | | |
|---|---|---|
| 1-103889 | 4/1989 | Japan . |
| 4-15974 | 1/1992 | Japan . |
| 4-22178 | 1/1992 | Japan . |
| 6-291391 | 10/1994 | Japan . |
| 6-105812 | 12/1994 | Japan . |
| 7-54864 | 6/1995 | Japan . |

*Primary Examiner*—Leon Scott, Jr.
*Attorney, Agent, or Firm*—Flynn, Thiel, Boutell & Tanis, P.C.

[57] ABSTRACT

The invention relate to a laser oscillator containing at least one pair of main electrodes within a laser tube. In accordance with the first invention, a downstream one of the main electrodes provided within the laser tube which is located downstream, as viewed in the direction of flow of a laser gas, is substantially L-shaped, with its distal end being supported to extend in a direction to intersect with the axial direction of the laser tube. This improves the oscillation efficiency in exciting the laser radiation as compared with the prior art. According to the second aspect of the invention, a pair of ring-shaped pre-ionization electrodes are disposed upstream of the main electrodes, and there is provided a pre-ionization power supply which applies a high voltage, which may be a pulse wave or an alternating voltage, across the pair of pre-ionization electrodes. The provision of the pair of pre-ionization electrodes enables a uniform pre-ionization, thus allowing a stabilized main discharge to be achieved across the main electrodes.

10 Claims, 9 Drawing Sheets

○ prior art tube
△ novel tube (embodiment)

LASER OSCILLATOR

FIELD OF THE INVENTION

The invention relates to a laser oscillator, and more particularly, to a laser oscillator containing at least one pair of main electrodes within a laser tube.

DESCRIPTION OF THE PRIOR ART

A laser oscillator is known in the art as disclosed in Japanese Laid-Open Patent Application No.291, 391/94. This laser oscillator includes a plurality of sets of the main electrodes disposed in the axial direction of a laser tube, each main electrode being formed to be L-shaped and the distal ends of the main electrodes of the respective set being disposed so as to be opposite to each other. However, a disadvantage is pointed out with this conventional laser oscillator that it suffers from a poor oscillation efficiency.

Also in this equipment, the opposite ends of a laser tube are supported by support members, and two sets of main electrodes are disposed axially within the tube. However, with a conventional laser oscillator which is provided with only main electrodes as mentioned, it may not be possible that a discharge across the main electrodes start up smoothly.

Accordingly, in the prior art, there has been proposed a laser oscillator in which preliminary ionization electrodes are provided in addition to the main electrodes to produce a preliminary ionization before the main discharge takes place. An arrangement is proposed, as an example, in which a preliminary ionization takes place between the main electrode which serves as a cathode and a ring which serves a preliminary ionization electrode (see, for example, Japanese Laid-Open Patent Applications No.103, 889/89, No.15, 974/92 and No.22, 178/92).

Secondly, there is also a proposal in which a preliminary ionization takes place between a pin which serves as a preliminary ionization electrode and the main electrode which serves as an anode (see, for example, Japanese Patent Publication No.105, 812/94).

Thirdly, there is a proposal in which a preliminary ionization occurs between a ring serving as a preliminary ionization electrode and the main electrode which serves as an anode (see, for example, Japanese Patent Publication No.54, 864/95).

However, with conventional arrangements which are provided with a preliminary ionization electrode, one of preliminary ionization electrodes is served by the main electrode.

Accordingly, in such a conventional arrangement, there is a disadvantage that a uniform preliminary ionization of the laser tube cannot occur as the external diameter of the laser tube increases. Also, before a discharge across the main electrodes takes place, a d.c. high voltage source which is used as a power source for the main electrodes must be previously driven at a lower output.

SUMMARY OF THE INVENTION

In view of the foregoing, the first invention provides a laser oscillator including at least one pair of main electrodes disposed within a laser tube, and a d.c. source which applies a high voltage across the main electrodes, with the laser tube being fed with a gas to maintain a gas flow within the laser tube. In accordance with the invention, one of the main electrodes disposed downstream as viewed in the direction of the gas flow is substantially L-shaped, and the distal end of the main electrode is supported to extend in a direction intersecting with the direction of the gas flow. This arrangement enables an oscillation efficiency of laser radiation to be improved, as compared with the prior art.

In view of the foregoing, the second invention provides in a laser oscillator comprising at least one pair of main electrodes disposed within a laser tube, a d.c. power source which applies a high voltage across the main electrodes, and gas feed means for feeding a gas into the laser tube, in accordance with the present invention, a pair of ring-shaped preliminary ionization electrodes are disposed upstream of the main electrode, as viewed in the direction of the gas flow which passes through the laser tube, and a preliminary ionization power source is provided which applies either a pulse wave of high voltage or an a.c. high voltage across the preliminary ionization electrodes.

With this arrangement, the preliminary ionization electrodes are provided separately from the main electrodes, and a preliminary ionization power source is provided separately from the d.c. source for the main electrodes. As a consequence, a uniform preliminary ionization can take place by the preliminary ionization electrodes to allow a stabilized main discharge across the main electrodes, independently from the magnitude of the diameter of the laser tube. In other words, if the external diameter of the laser tube increases, a uniform preliminary ionization is assured by the preliminary ionization electrodes.

In addition, since the preliminary ionization power source is provided separately from the d.c. source for the main electrodes, the d.c. source for the main electrodes may be driven only when a laser radiation output is required. In other words, it is unnecessary to drive the d.c. high voltage source, which provides a power source for the main electrodes, previously at the lower output before the main discharge takes place.

Above and other objects, the features and advantages of the invention will become apparent from the following description of several embodiments there of with reference to the attached drawings.

DETAILED DESCRIPTION OF THE EMBODIMENTS

Figure 1:
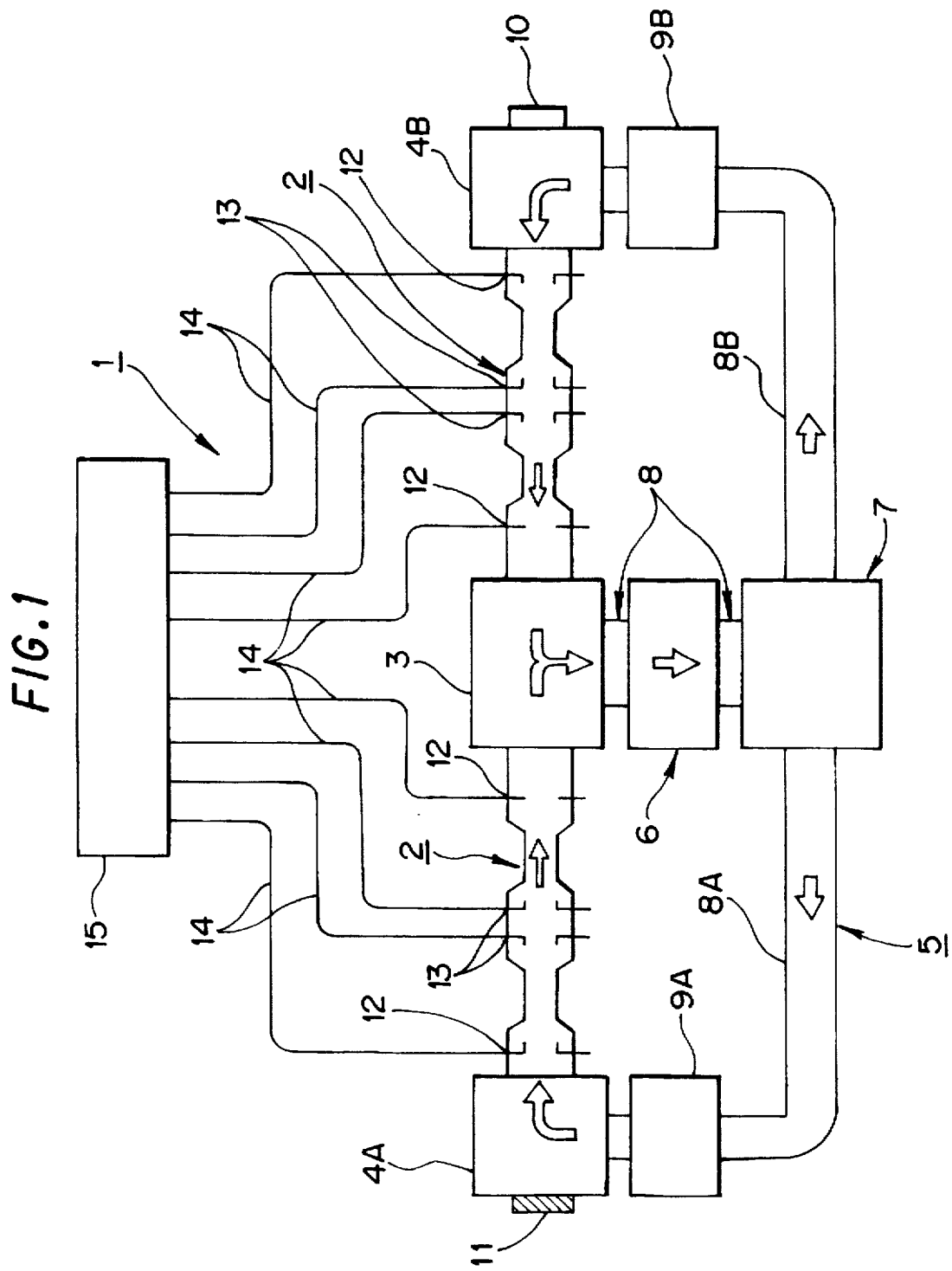
FIG. 1 is a view illustrating an overall layout of one embodiment of the invention.

Referring to the drawings, the several embodiments of the invention will now be described. Initially referring to FIG. 1, there is shown a laser oscillator 1 having a pair of laser tubes 2, which have an identical construction, disposed in axial alignment. One end of each of the laser tubes 2, which are disposed opposite to each other, is supported by a manifold 3 which serves as a common support member. The other end of the respective laser tube 2 is supported by a manifold 4A or 4B which also serves as a support member.

Laser gas feed means 5 feeds a laser gas to each of the laser tubes 2 through the manifolds 4A, 4B located at the opposite ends, and the laser gas from the respective laser tubes 2 are discharged externally from a central manifold 3 so as to allow a recirculation of the laser gas again into the respective laser tubes 2 through the manifolds 4A,.4B located at the opposite ends.

The laser gas feed means 5 comprises a heat exchanger 6 disposed downstream of the central manifold 3 for cooling the laser gas which is discharged from the laser tube 2, and a blower 7 disposed downstream of the heat exchanger 6. Connection tubes 8 connect between the manifold 3 and the heat exchanger 6 and between the heat exchanger 6 and blower 7.

The blower 7 is capable of delivering the laser gas in two directions. The laser gas from one of branches from the blower 7 is fed to one of the laser tubes 2 through a connection tube 8A, a heat exchanger 9A which heats the laser gas and the manifold 4A while the laser gas from the other branch is fed to the other laser tube 2 through a connection tube 8B, a heat exchanger 9B which heats the laser gas and the manifold 4b. Each of the connection tubes 8A, 8B is manufactured from a insulating material, and is cylindrical in configuration.

One of the manifolds, 4B, is provided with a reflecting mirror 10 which reflects the laser radiation excited within the associated laser tube 2 while the other manifold 4A is provided with an output mirror 11 which reflects laser radiation excited within the associated laser tube 2 and also transmits the laser radiation therethrough. The reflecting mirror 10 and the output mirror 11 are disposed in opposing relationship with each other on the axis of the pair of laser tubes 2. Laser radiation which is driven into resonance between the pair of mirrors 10, 11 can be emitted to the left through the output mirror 11.

Each of the laser tubes 2 contains two sets of main electrodes disposed in opposing relationship with each other, each set comprising a pair of main electrodes 12, 13. One of the main electrodes in each pair comprises a ground electrode 12, which is disposed toward either end of each laser tube 2, or adjacent to the respective manifolds 3, 4A, 4B. The other or non-grounded electrode is disposed at the center of each laser tube. In the present embodiment, the ground electrode 12 is used as an anode while the non-grounded electrode 13 is used as a cathode. Alternatively, the ground electrode 12 may be used as a cathode and the non-grounded electrode 13 may be used as an anode.

The electrodes 12, 13 of the respective pairs are connected through leads 14 to a d.c. high voltage circuit 15 which functions as a power source to apply a high voltage across the electrodes 12, 13 of each pair while passing a laser gas through the laser tube 2, thus producing a discharge across the pair of main electrodes to enable the laser gas to be excited.

Figure 2:
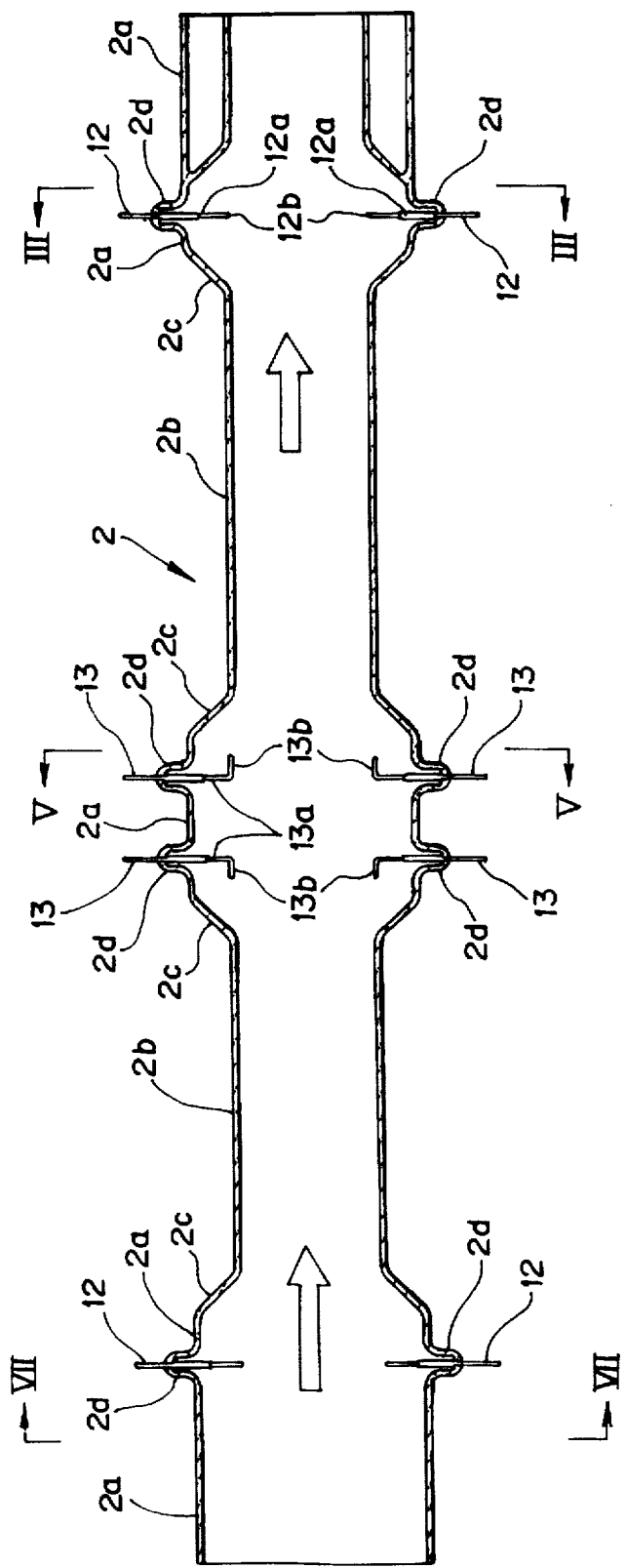
FIG. 2 is a cross section to an enlarged scale of a left-hand laser tube 2 shown in FIG. 1.

FIG. 2 is an enlarged cross section of the left-hand laser tube 2. The laser tube 2 has a wall thickness which is uniform throughout the axial length thereof. However, the laser tube has a portion 2a of an increased diameter at its opposite axial ends and at its central portion while it has a portion 2b of a reduced diameter in the remainder. The portion 2b of a reduced diameter and the portion 2a of an increased diameter are jointed together by a tapered portion 2c. As mentioned previously, the ground electrode 12 (anode) is disposed in the potions 2a of the laser tube which are disposed at the opposite ends while the non-grounded electrode 13 (cathode) is disposed in the portion 2a of an increased diameter which is disposed at the center of the laser tube 2.

Figure 3:
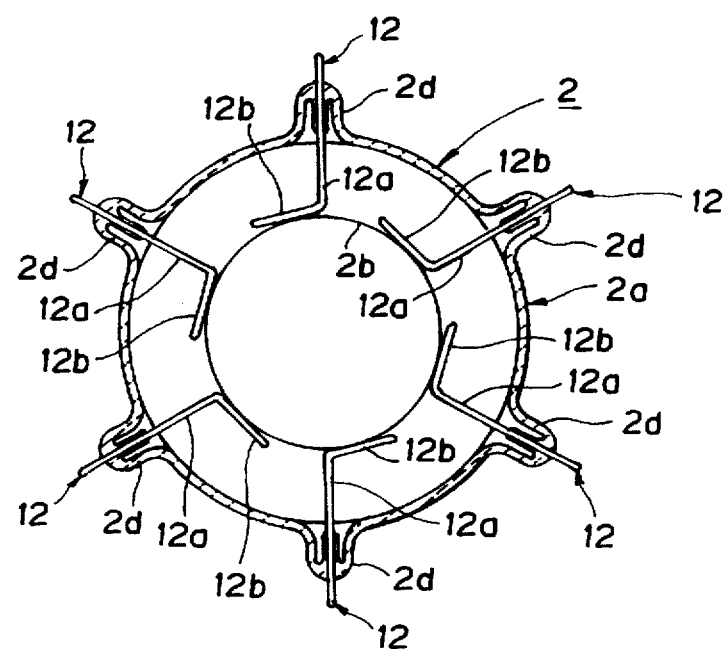
FIG. 3 is a cross section taken along the line III—III shown in FIG. 2.
Figure 5:
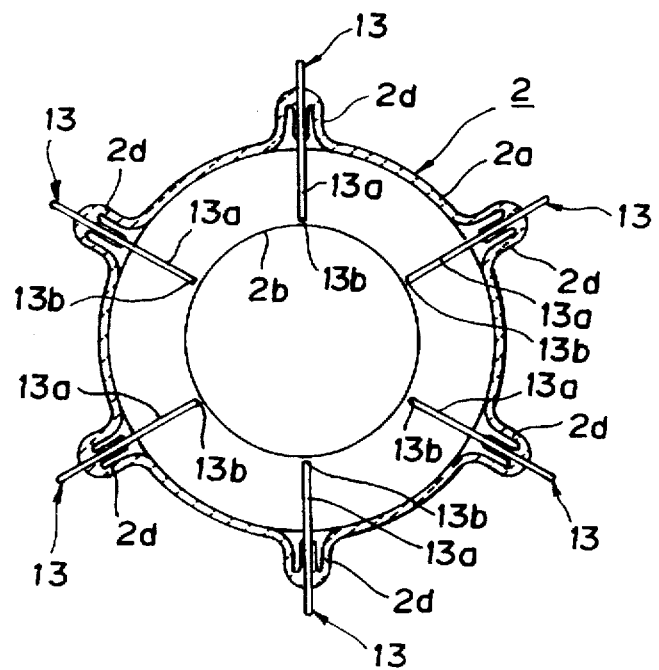
FIG. 5 is a cross section taken along the line V—V shown in FIG. 2.
Figure 7:
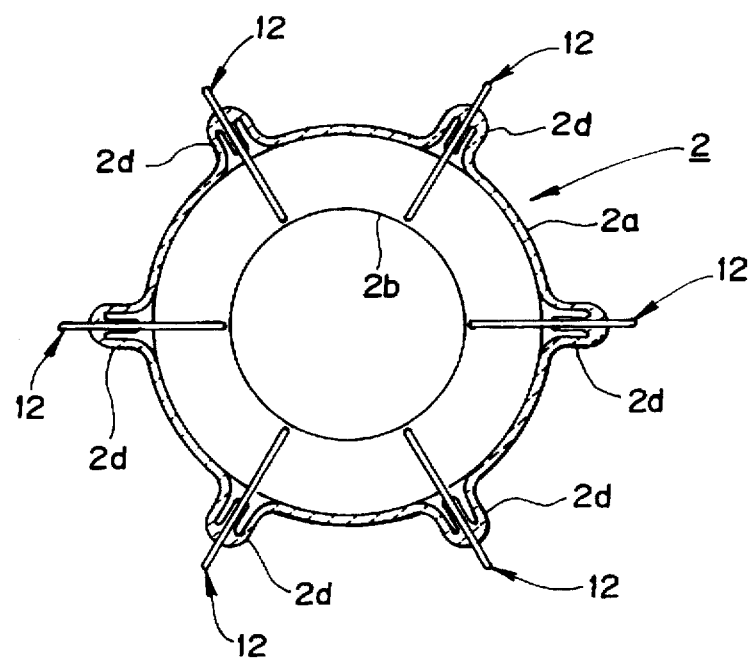
FIG. 7 is a cross section taken along the line VII—VII shown in FIG. 2.

The portion 2a of the laser tube 2 which has an increased diameter is provided with a plurality of protuberances 2d which extend radially outward. Either the ground electrode 12 (anode) or the non-grounded electrode 13 (cathode) in the form of a rod radially extends through the center of each protuberance 2d and is secured in place by an intermediate glass member. The purpose of the intermediate glass member is to accommodate for thermal expansion which the respective electrodes 12, 13 experience. As shown in FIGS. 3, 5 and 7, six protuberances 2d are provided which are spaced apart at an equal interval circumferentially of the laser tube 2, each protuberance 2d containing either the ground electrode 12 (anode) or non-grounded electrode 13 (cathode). Thus, in the present embodiment, each of the ground electrode 12 (anode) and the non-grounded electrode 13 (cathode) comprises a set of six rods which are spaced apart circumferentially.

Figure 6:
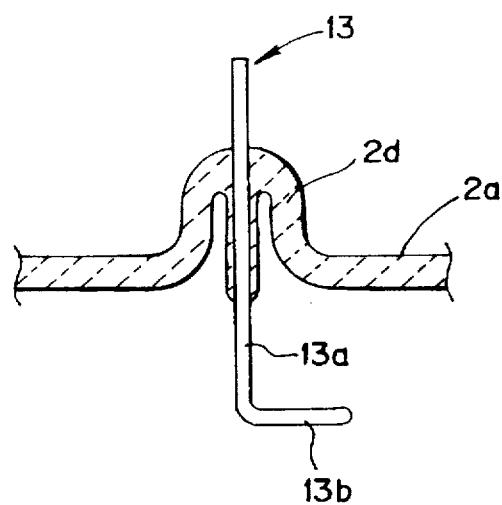
FIG. 6 is an enlarged view of an essential part shown in FIG. 2.

As shown in FIG. 6, the non-grounded electrode 13 (cathode) which is disposed in the portion 2a of an increased diameter which is located at the center of the laser tube 2 is generally L-shaped. Specifically, the electrode 13 comprises a connection piece 13a which is connected to the protuberance 2b of the laser tube 2 and supported to extend along the radial direction of the laser tube 2, and a distal end 13b which continues from the inner end of the connection piece 13a and is bent at right angles therefrom. The electrode 13 thus constructed has its distal end 13b directed toward the ground electrode 12 (anode). Thus, referring to FIG. 2, the right-hand electrode 13 (cathode) has its distal end 13b directed downstream as viewed in the direction of the flow of laser gas. Conversely, the left-hand non-grounded electrode 13 (cathode) has its distal end 13b directed toward the left-hand ground electrode 12 (anode), or upstream as viewed in the direction of flow of the laser gas. In addition, as indicated in FIG. 5, the distal end 13b of the electrode 13 (cathode) lies substantially on the same plane as the inner peripheral surface of the portion 2b of a reduced diameter, as viewed in the radial direction of the laser tube 2.

Figure 8:
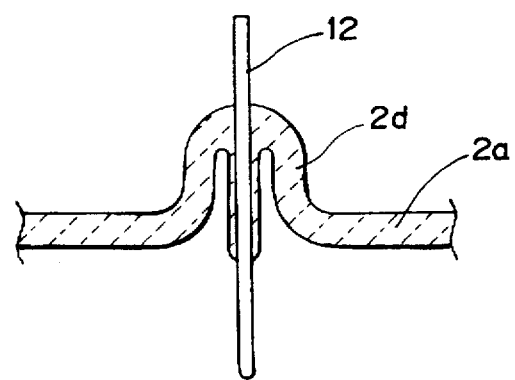
FIG. 8 is an enlarged view of an essential part shown in FIG. 2.

By contrast, the ground electrode 12 (anode) which is located on the upstream side (or to the left) as viewed in the direction of flow of the laser gas comprises a rectilinear rod, as indicated in FIGS. 7 and 8. The inner end of the ground electrode 12 or its distal end lies substantially on the same plane as the inner peripheral surface of the portion 2b of a reduced diameter, as viewed in the radial direction of the laser tube 2.

In the present embodiment, in order to improve the efficiency of exciting the laser radiation, the ground electrode 12 which is disposed downstream (or to the right) as viewed in the direction of flow laser gas is modified in a manner to be described below.

Figure 4:
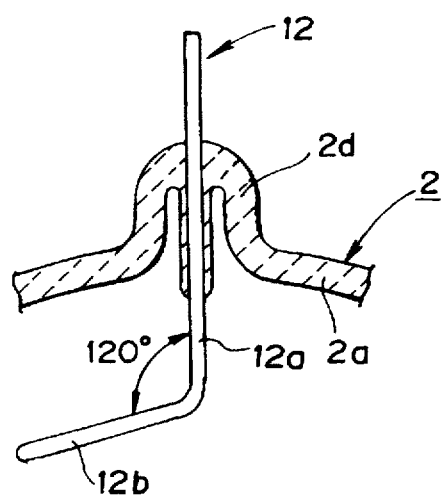
FIG. 4 is an enlarged view of an essential part shown in FIG. 3.

Thus, referring to FIGS. 3 and 4, the ground electrode 12 which is disposed downstream is generally substantially L-shaped. The ground electrode 12 comprises a connection piece 12a connected to the protuberance 2d of the tube 2 and extending radially of the laser tube 2, and a distal end 12b which continues from the inner end of the connection piece 12a and is bent therefrom at an obtuse angle. In the present embodiment, the distal end 12b of the downstream ground electrode 12 thus constructed is supported to extend in a direction intersecting with the axial direction of the laser tube 2, as shown in FIG. 4. In addition, the distal end 12b of the ground electrode 12 which is supported in this manner has its end located to be slightly displaced radially outward from the inner peripheral surface of the portion 2b of the laser tube 2 which has a reduced diameter. In this manner, the distal end 12b of the ground electrode 12 extends in a direction of tangent to the inner peripheral surface of the portion 2b of a reduced diameter, and all the distal ends are directed in a similar orientation. Preferably, the connection piece 12a and the distal end 12b of the ground electrode 12 form an angle of approximately 120° therebetween.

It is to be understood that the right-hand laser tube 2 shown in FIG. 1 has the identical construction as the left-hand laser tube 2, mentioned above, as referenced to the direction of flow of the laser gas, and therefore will not to be described.

As described, in the present embodiment, the ground electrode 12 (anode) which is disposed downstream as viewed in the direction of flow of the laser gas is substantially L-shaped, and its distal end 12b is disposed to intersect with the direction of flow of the laser gas. This is effective in improving the oscillation efficiency when exciting the laser radiation.

Figure 9:
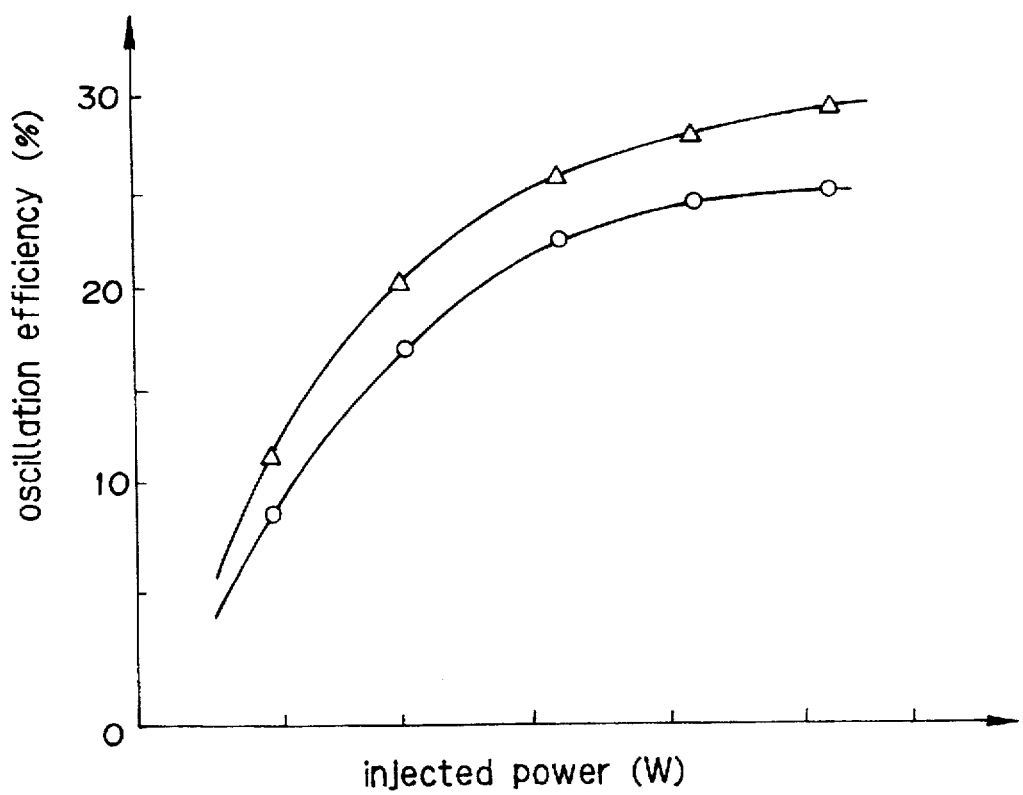
FIG. 9 graphically shows the performance of the present embodiment in comparison to the prior art.

FIG. 9 graphically indicates a result of experiment which compared the present embodiment against the prior art with respect to the oscillation efficiency in exciting the laser radiation. It will be appreciated from FIG. 9 that the oscillation efficiency in exciting the laser radiation according to the embodiment is improved over the prior art. The prior art which is relied upon in this experiment is a laser oscillator disclosed in Japanese Laid-Open Patent Application No.291, 391/94. In this laser oscillator of the prior art, not only the central electrode 13, but the ground electrode 12 is also L-shaped in the same manner as the non-grounded electrode 13, with the distal ends of the both L-shape electrodes 12, 13 disposed in opposing relationship with each other within the laser tube 2.

Second Embodiment

Figure 10:
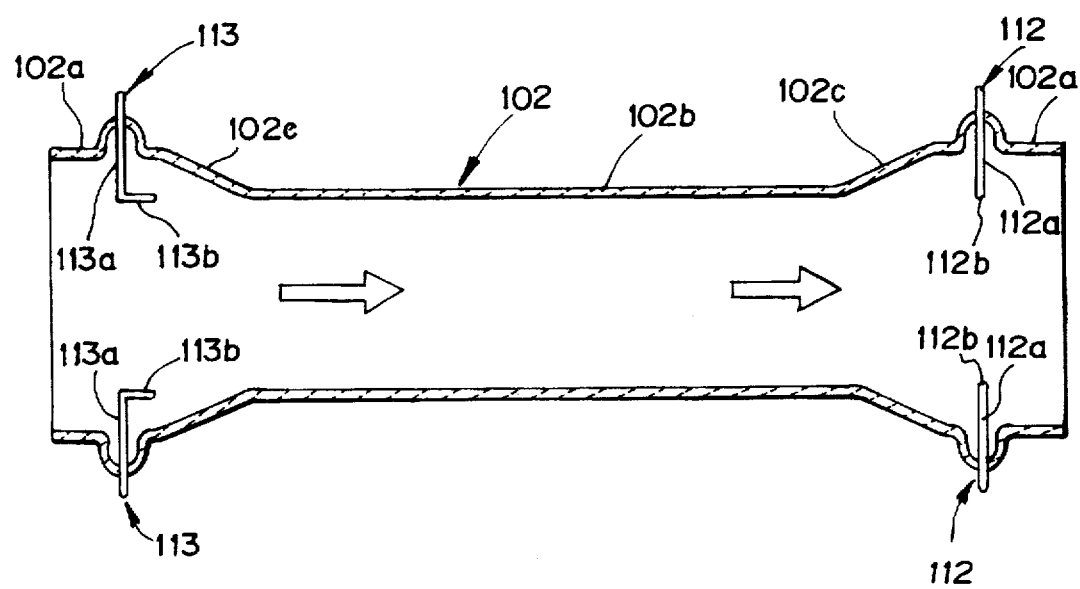
FIG. 10 is a cross section of another embodiment of the invention.

FIG. 10 shows a second embodiment of the invention in a simplified form. While the two pairs of main electrodes 12, 13 are disposed within a single laser tube 2 in the first embodiment mentioned above, only one pair of main electrodes 112, 113 are disposed in the second embodiment. Specifically, an L-shaped main electrode 113, which serves as an anode, is disposed at an upstream position, as viewed in the direction of flow of the laser gas, with its distal end 113b supported to extend downstream. By contrast, an main electrode 112 which is disposed downstream as viewed in the direction of flow of the laser gas serves as a cathode, and is constructed in the same manner as in the first embodiment, with its distal end 112b supported to intersect with the axial direction of the laser tube 2 in the same manner as in the first embodiment.

The second embodiment thus constructed achieves a similar function and effect as achieved by the first embodiment. In the second embodiment, parts corresponding to those shown in the first embodiment are designated by like numerals and characters as used before, to which 100 is added.

Third Embodiment

As an alternative, only the right-hand half, located to the right of the axial center of the laser tube 2 shown in FIG. 2 may comprise a laser tube 2. With this arrangement, a similar function and effect can be achieved as achieved by the described embodiments.

Fourth Embodiment

Figure 11:
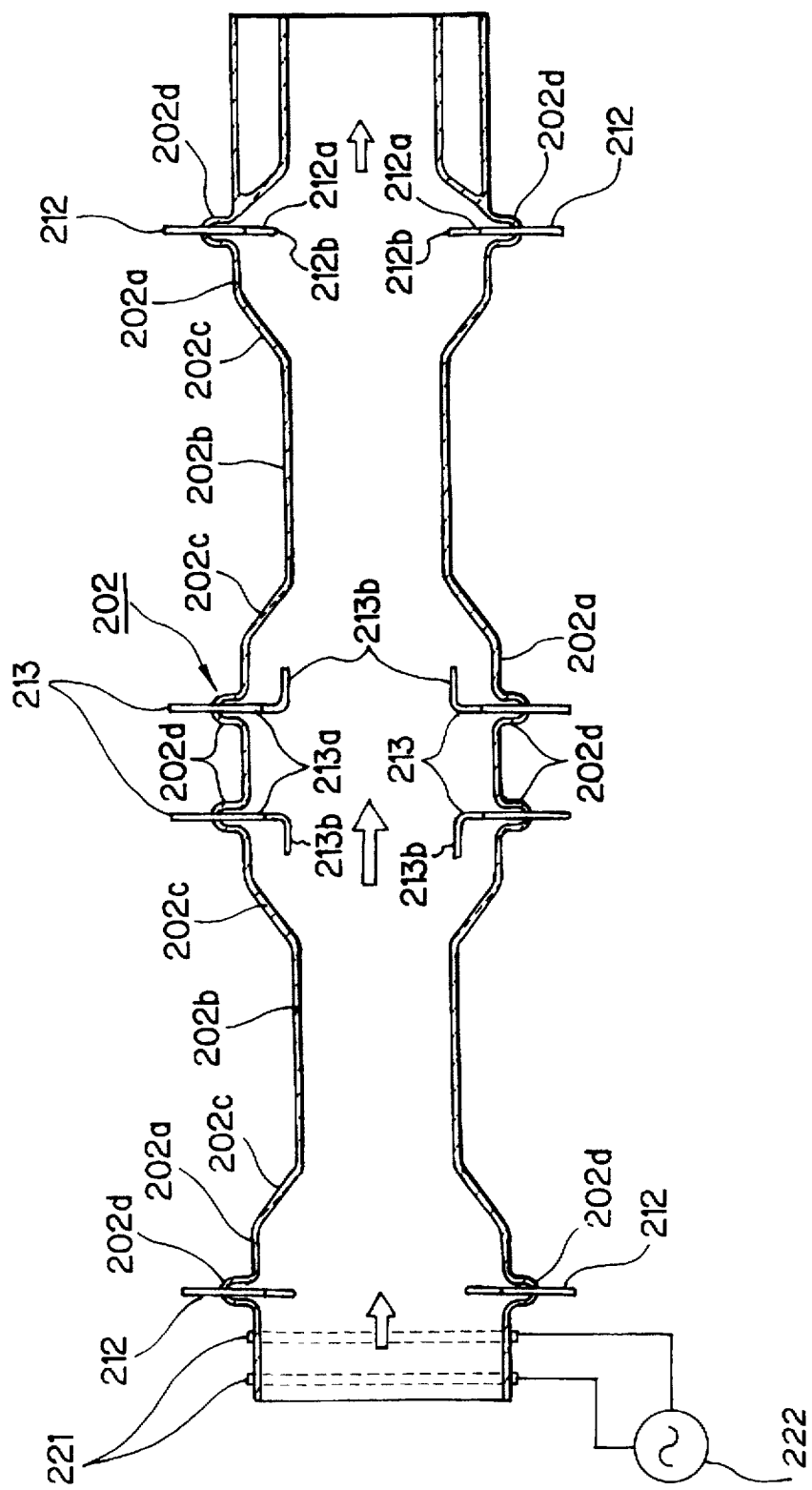
FIG. 11 is a cross section of a further embodiment of the invention.

FIG. 11 shows a fourth embodiment of the invention which is based on the construction of the laser tube according to the first embodiment shown in FIG. 2, and in which preliminary ionization electrodes are additionally provided. Thus, referring to FIG. 11, a pair of ring-shaped preliminary ionization electrodes 221 are disposed around the outer periphery of a laser tube 202 at a location which is upstream of a most upstream (or leftmost) main electrode 212, as viewed in the direction of flow of a laser gas.

Figure 12:
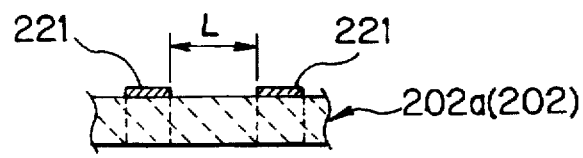
FIG. 12 is an enlarged cross section of an essential part shown in FIG. 11.

As shown to an enlarged scale in FIG. 12, each of the preliminary ionization electrodes 221 comprises a thin sheet of copper. The pair of preliminary ionization electrode 221 are mounted around the outer peripheral surface of the laser tube 202 so that an equal distance or a spacing L can be maintained therebetween, as viewed in the axial direction of the laser tube 202, over the entire circumferential range of the laser tube 202.

The both preliminary ionization electrodes 221 are connected to a devoted a.c. high voltage source 222. Immediately before a main discharge takes place across the main electrodes 212, 213, an a.c. voltage of 3,000 V is applied from the source 222 across the both the preliminary ionization electrodes 221, thus producing a preliminary ionization within the laser tube 202 at a location of the both electrodes 221. This allows a subsequent main discharge to occur smoothly.

In the fourth embodiment thus constructed, the pair of ring-shaped preliminary ionization electrodes 221 are provided separately from the main electrodes 212, 213 and are connected to the devoted a.c. source 222. Accordingly, an even preliminary ionization can occur within the laser tube 202 independently from the diameter of the laser tube 202. This allows a smooth and stabilized main discharge to occur between the main electrodes 212, 213. Because the pair of preliminary ionization electrodes 221 are spaced apart at an equal spacing over the entire circumferential range thereof, it is possible to produce an even preliminary ionization over the entire circumferential range thereof. Accordingly, in the fourth embodiment, the oscillation efficiency in exciting the laser radiation can be improved over the first embodiment.

In this embodiment, a downstream ground electrode (anode), as viewed in the direction of flow of laser gas, is substantially L-shaped, with its distal end disposed in a direction transverse to the direction of flow of laser gas in the similar manner as in the first to the third embodiment. However, where a pre-ionization electrode is provided, the distal end of the downstream L-shaped ground electrode (anode) may be directed toward the upstream electrode.

Fifth Embodiment

Figure 13:
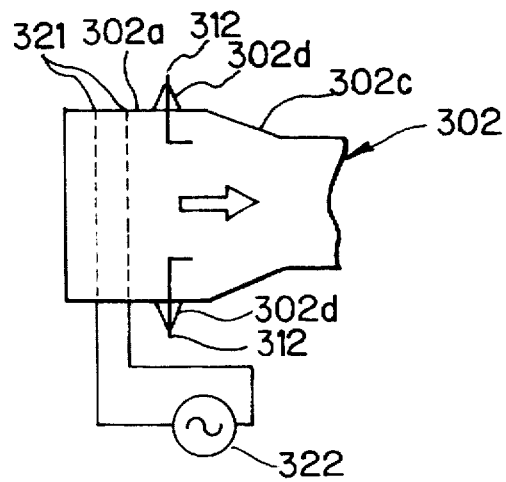
FIG. 13 is a cross section of still further embodiment of the invention.
Figure 14:
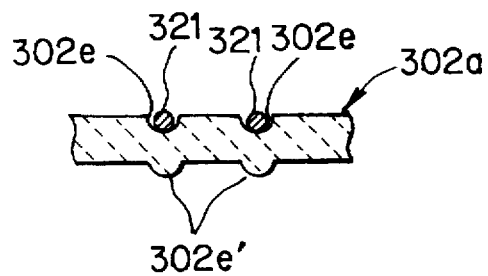
FIG. 14 is an enlarged view of an essential part shown in FIG. 13.

FIGS. 13 and 14 show another embodiment in which preliminary ionization electrodes are provided. In this embodiment, each of the preliminary ionization electrodes 321 comprises a copper wire which is circular in section. In this embodiment, a pair of annular grooves 302e, which are spaced apart by a given axial distance, are formed in the outer peripheral surface of a laser tube 302 for receiving the preliminary ionization electrodes 321 comprising the copper wires therein. As a result of forming the annular grooves 302e in the outer peripheral surface of the laser tube 302, annular projections 302e are formed in the inner peripheral surface of the laser tube 302 at corresponding positions in this embodiment. This embodiment again achieves a similar function and effect as achieved by the fourth embodiment.

Sixth Embodiment

Figure 15:
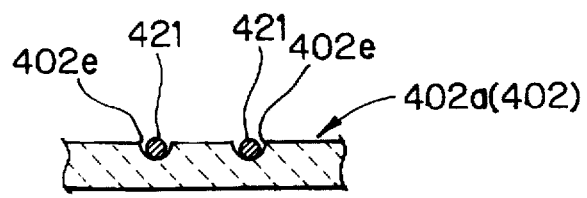
FIG. 15 is a cross section of yet another embodiment of the invention.

FIG. 15 shows a sixth embodiment of the invention in which the annular projections 302e formed in the laser tube 302 of the fifth embodiment are eliminated to provide a smooth inner peripheral surface for a laser tube 402. In other respects, the arrangement in similar to the fifth embodiment, and sixth embodiment again achieves the similar function and effect as achieved by the fifth embodiment.

In the fourth to the sixth embodiment, an a.c. high voltage source is used as a power source for the preliminary ionization electrodes. However, the a.c. source may be replaced by a power source which produces a pulse wave of a high voltage to be applied across the preliminary ionization electrodes.

While the invention has been shown and described above in connection with several embodiments thereof, it should be understood that a number of changes, modifications and substitutions therein are possible by one skilled in the art from the above disclosure without departing from the scope and spirit of the invention defined by the appended Claims.

What is claimed is:

1. A laser oscillator having at least one laser tube comprising at least one pair of main electrodes disposed within the laser tube, and a d.c. source which applies a high voltage across the main electrodes, with the laser tube being fed with a gas to maintain a gas flow through the laser tube;

characterized in that one of the main electrodes of the pair which is disposed downstream as viewed in the direction of the gas flow is substantially L-shaped, with a distal end of the main electrode being supported to extend in a direction to intersect with the direction of the gas flow.

2. A laser oscillator according to claim 1 in which two pairs of main electrodes are sequentially disposed within the laser tube in the axial direction thereof, a most downstream one of the main electrodes of the two pairs, as viewed in the direction of the gas flow, being L-shaped.

3. A laser oscillator according to claim 1 further comprising a pair of ring-shaped preliminary ionization electrodes disposed upstream of the main electrodes as viewed in the direction of the gas flow through the laser tube, and a preliminary ionization power source which applies a pulse wave or an a.c. of a high voltage across the preliminary ionization electrodes.

4. A laser oscillator according to claim 3 in which the pair of preliminary ionization electrodes are disposed around the outer peripheral surface of the laser tube while maintaining a given spacing therebetween in the axial direction of the laser tube.

5. A laser oscillator according to claim 3 in which the pair of preliminary ionization electrodes are disposed in a pair of annular grooves which are formed in the outer periphery of the laser tube with an axial separation therebetween.

6. A laser oscillator having at least one laser tube comprising at least one pair of main electrodes disposed within the laser tube, a d.c. power source which applies a high voltage across the main electrodes, and gas feed means which feeds a gas into the laser tube and maintains a gas flow through the laser tube;

characterized in that a pair of ring-shaped preliminary ionization electrodes are disposed upstream of the main electrodes, as viewed in the direction of the gas flow which passes through the laser tube;

a preliminary ionization power source being provided for applying a pulse wave of high voltage or an a.c. of high voltage across the preliminary ionization electrodes.

7. A laser oscillator according to claim 6 in which the pair of preliminary ionization electrodes are disposed around the outer peripheral surface of the laser tube while maintaining a given spacing therebetween in the axial direction of the laser tube.

8. A laser oscillator according to claim 6 in which the pair of preliminary ionization electrodes are disposed in a pair of annular grooves which are formed in the outer periphery of the laser tube with an axial separation therebetween.

9. A laser oscillator according to claim 6 one of the main electrodes of the pair which is disposed downstream as viewed in the direction of the gas flow is substantially L-shaped, with a distal end of the main electrode being supported to extend in a direction to intersect with the direction of the gas flow.

10. A laser oscillator according to claim 9 in which two pairs of main electrodes are sequentially disposed within the laser tube in the axial direction thereof, a most downstream one of the main electrodes of the two pairs, as viewed in the direction of the gas flow, being L-shaped.

* * * * *